US012195331B2

(12) United States Patent
Shin et al.

(10) Patent No.: US 12,195,331 B2
(45) Date of Patent: Jan. 14, 2025

(54) APPARATUS FOR SYNTHESIZING NANO-PARTICLES USING ELECTRON BEAM

(71) Applicant: KORENS RTX Co., Ltd., Gyeryong-si (KR)

(72) Inventors: Jong Min Shin, Daejeon (KR); Dae Soo Yang, Daejeon (KR); Ki Baek Song, Sejong-si (KR); Yeong Cheol Yoon, Daegu (KR); Hyean Yeol Park, Daejeon (KR); So Yeon Lim, Sejong-si (KR)

(73) Assignee: KORENS RTX Co., Ltd., Gyeryong-si (KR)

( * ) Notice: Subject to any disclaimer, the term of this patent is extended or adjusted under 35 U.S.C. 154(b) by 432 days.

(21) Appl. No.: 17/854,174

(22) Filed: Jun. 30, 2022

(65) Prior Publication Data

US 2023/0025290 A1    Jan. 26, 2023

(30) Foreign Application Priority Data

Jul. 7, 2021    (KR) .................. 10-2021-0089042
Aug. 31, 2021   (KR) .................. 10-2021-0115423

(51) Int. Cl.
| | |
|---|---|
| G21F 5/06 | (2006.01) |
| B82B 3/00 | (2006.01) |
| F16L 3/08 | (2006.01) |
| G21F 5/12 | (2006.01) |
| G21F 7/00 | (2006.01) |
| G21F 7/005 | (2006.01) |
| G21K 5/00 | (2006.01) |
| G21K 5/02 | (2006.01) |
| G21K 5/04 | (2006.01) |
| H02G 3/00 | (2006.01) |
| G21F 5/10 | (2006.01) |

(52) U.S. Cl.
CPC .............. *B82B 3/0004* (2013.01); *F16L 3/08* (2013.01); *G21F 5/06* (2013.01); *G21F 5/12* (2013.01); *G21F 7/00* (2013.01); *G21F 7/005* (2013.01); *G21K 5/02* (2013.01); *G21K 5/04* (2013.01); *H02G 3/26* (2013.01); *G21F 5/10* (2013.01)

(58) Field of Classification Search
None
See application file for complete search history.

(56) References Cited

U.S. PATENT DOCUMENTS

| | | | | |
|---|---|---|---|---|
| 2011/0052455 | A1* | 3/2011 | Kim | ................. H01J 37/06 422/186 |
| 2014/0246603 | A1* | 9/2014 | Wilson | ................. B05D 3/067 250/492.1 |

FOREIGN PATENT DOCUMENTS

| | | |
|---|---|---|
| JP | 3569329 B2 | 9/2004 |
| KR | 10-0479844 B1 | 3/2005 |
| KR | 10-1013600 B1 | 2/2011 |
| KR | 10-1080925 B1 | 11/2011 |

(Continued)

*Primary Examiner* — Eliza W Osenbaugh-Stewart
(74) *Attorney, Agent, or Firm* — Sughrue Mion, PLLC

(57) ABSTRACT

An embodiment of the present disclosure relates to an apparatus for synthesizing nanoparticles by irradiating, with an electron beam, a nanoparticle aqueous solution in a reaction vessel provided inside a shielding chamber, and more particularly, to an apparatus for synthesizing nanoparticles, which is capable of preventing radiation generated in a shielding chamber from leaking out, and facilitating maintenance and repair.

20 Claims, 21 Drawing Sheets

(56) References Cited

FOREIGN PATENT DOCUMENTS

| KR | 10-2013-0110894 A | 10/2013 |
| --- | --- | --- |
| KR | 10-1882737 B1 | 7/2018 |
| KR | 10-2019-0090492 A | 8/2019 |
| KR | 10-2019-0139551 A | 12/2019 |
| KR | 10-2081608 B1 | 2/2020 |
| KR | 10-2108365 B1 | 5/2020 |

* cited by examiner

FIG. 15

| Sample No. | Sample Name. | 2 theta | Crystallite size (nm) |
|---|---|---|---|
| 1 | Pt/C - 1 sec | 39.851 | 1.7 |
| 2 | Pt/C - 20 sec | 39.815 | 3.5 |
| 3 | Pt/C - 40 sec | 39.826 | 3.7 |
| 4 | Pt/C - 60 sec | 39.828 | 5.1 |

FIG. 18

|  | 1 | 2 | 3 | 4 |
|---|---|---|---|---|
|  | Pt/C - 01 sec | Pt/C - 20 sec | Pt/C - 40 sec | Pt/C - 60 sec |
| Half Potential(V) | 0.926 | 0.921 | 0.927 | 0.922 |
| Mass activity(A/$mg_{pt}$)@0.9$V_{RHE}$ | 0.109 | 0.090 | 0.108 | 0.093 |
| ECSA($m^2$/g) | 85.3 | 83.5 | 84.1 | 79.4 |

APPARATUS FOR SYNTHESIZING NANO-PARTICLES USING ELECTRON BEAM

CROSS-REFERENCE TO RELATED APPLICATION

This application is based on and claims priority under 35 U.S.C. § 119 to Korean Patent Application Nos. 10-2021-0089042, filed on Jul. 7, 2021, and 10-2021-0115423, filed on Aug. 31, 2021, in the Korean Intellectual Property Office, the disclosure each of which is incorporated by reference herein in its entirety.

FIELD

The present disclosure relates to an apparatus for synthesizing nanoparticles by irradiating, with an electron beam, a nanoparticle aqueous solution in a reaction vessel provided inside a shielding chamber, and more particularly, to an apparatus for synthesizing nanoparticles, which is capable of preventing radiation generated in a shielding chamber from leaking out, and facilitating maintenance and repair.

DESCRIPTION OF THE RELATED ART

Electron beams are used in various industrial fields, such as development of polymer materials, nanomaterials, fabrication of power semiconductors, purification of wastewater and exhaust gas, drying of eco-friendly paints, sterilization of food and medical equipment, production and sterilization of packaging containers, etc.

In particular, electron beam technology has recently been spotlighted as an effective means for mass-production of nanoparticles, and is recognized as a new technology that has higher efficiency, simpler processes, and no by-products harmful to the environment compared to existing chemical methods.

In detail, unlike conventional chemical methods of producing nanoparticles through an oxidation-reduction reaction, a nanoparticle production technology using an electron beam is a technology of irradiating, with electrons accelerated to near-light speed, a solution containing a raw material of nanoparticles (hereinafter, referred to as 'nanoparticle aqueous solution') to activate electrons in the solution, and converting a sample into uniform nanoparticles in a short time as the electrons having high reactivity cause a reduction.

Nanoparticles produced through such a process are excellent in quality and eco-friendly in that no chemical reducing agents that produce toxic by-products are used, compared to conventional chemical nanoparticle production processes. In addition, this approach is highly energy-efficient in that nanoparticles may be produced at room temperature, and is economical in that it requires low investment costs and a small facility space with only a small-size irradiation apparatus.

An apparatus for synthesizing nanoparticles by using an electron beam as described above includes, as basic components, a reactor to be filled with a nanoparticle aqueous solution, and an electron beam irradiator for irradiating the reactor with an electron beam. In an embodiment, the nanoparticle aqueous solution is an aqueous solution containing a raw material of polymeric nanoparticles to be used for synthesis, and has a characteristic in which polymeric nanoparticles are synthesized when irradiated with an electron beam.

One surface of the reactor, which faces the electron beam irradiator, is formed with an opening covered with a window, and thus the electron beam emitted from the electron beam irradiator is transmitted to the inside of the reactor through the window to synthesize the nanoparticles in the reactor.

In this case, the reactor is made of a material that has low thermal or electrical conductivity, thus is not deformed in volume or the like due to temperature, radiation, or the like, and scarcely undergoes a chemical reaction, for example, titanium, stainless steel, or an alloy thereof.

However, because a large amount of radiation is generated in a process of synthesizing nanoparticles by irradiating with an electron beam as described above, the electron beam irradiator and the reactor need to be installed inside a radiation shielding chamber. In this case, the electron beam irradiator and the reactor are connected to various wirings and pipes, such as a high-voltage cable, a cooler pipe, or a gas pipe, and there is a problem in that radiation may leak from a part where the wirings and the pipes penetrate the radiation shielding chamber.

In addition, in some cases, it is necessary to maintain and repair the wirings or the pipes during a nanoparticle synthesis process, however, when the wirings and the pipes are press-fitted into the radiation shielding chamber in an interference-fit manner, there is a problem in that it is difficult to maintain and repair the wirings or the pipes.

SUMMARY

Additional aspects will be set forth in part in the description which follows and, in part, will be apparent from the description, or may be learned by practice of the presented embodiments of the disclosure.

The present disclosure has been proposed to solve the above problems, and is to provide an apparatus for synthesizing nanoparticles, which is capable of preventing leakage of radiation generated in a shielding chamber even when various wirings and pipes are installed in the shielding chamber, and facilitating maintenance and repair of each component during a nanoparticle synthesis process.

According to an embodiment of the present disclosure, provided is an apparatus for synthesizing nanoparticles including: a radiation shielding chamber having a partition wall dividing an inner space thereof and an opening formed on a bottom surface of the inner space; an electron beam irradiator formed in the inner space of one side of the partition wall; a reactor formed in the inner space of another side of the partition wall; a power source unit formed in a lower part of the radiation shielding chamber and including a high-voltage cable passing through the opening; a chiller formed in a lower part of the radiation shielding chamber and including a cooler pipe passing through the opening; and a cable bracket including a lower cap, which has a lower opening formed in a part corresponding to one side of the opening and covers a lower part of the opening, an upper cap, which has an upper opening formed in a part corresponding to another side of the opening and covers an upper part of the opening, and a vertical plate formed between the lower cap and the upper cap, wherein the high-voltage cable and the cooler pipe are formed to be in a zigzag pattern in the cable bracket.

In an embodiment, a transmission window is formed in the partition wall of the radiation shielding chamber, the reactor includes a container body and a container cover covering an upper part of the container body, and the container body has a container window formed therein to correspond to the transmission window.

In an embodiment, a lower insertion groove is formed on the lower cap, an upper insertion groove is formed on the upper cap, and a lower shielding bar and an upper shielding bar are inserted into the lower insertion groove and the upper insertion groove, respectively.

In an embodiment, the lower shielding bar and the upper shielding bar are each formed as a lead block having an outer surface surrounded by an iron plate.

In an embodiment, the cable bracket further includes a guide cap formed in an upper part of the upper opening.

In an embodiment, the guide cap is formed to be laterally open along a longitudinal direction of the opening.

In an embodiment, an auxiliary hole is formed in the bottom surface of the inner space of the radiation shielding chamber, and the apparatus further comprises an auxiliary bracket including a lower auxiliary cap covering a lower part of the auxiliary hole and having a lower hole formed in a bottom surface thereof, and an upper auxiliary cap covering an upper part of the auxiliary hole and having a side opening formed in a side surface thereof.

In an embodiment, the side opening of the upper auxiliary cap is formed on a side surface thereof opposite to a direction corresponding to the partition wall.

According to another embodiment of the present disclosure, there is provided an apparatus for synthesizing nanoparticles including: a radiation shielding chamber having a partition wall dividing an inner space thereof and an opening formed on a bottom surface of the inner space; an electron beam irradiator formed in the inner space of one side of the partition wall; a reactor formed in the inner space of another side of the partition wall; a cable bracket including a lower cap, which has a lower opening formed therein and covers a lower part of the opening, and an upper cap, which has an upper opening formed therein and covers an upper part of the opening; a power source unit formed in a lower part of the radiation shielding chamber and including a high-voltage cable passing through the opening through the lower opening and the upper opening; and a chiller formed in a lower part of the radiation shielding chamber and including a cooler pipe passing through the opening through the lower opening and the upper opening, wherein the cable bracket further includes a guide cap formed in an upper part of the upper opening.

In an embodiment, the guide cap is formed to be laterally open along a longitudinal direction of the opening.

In an embodiment, the cable bracket has at least two vertical plates formed between the lower cap and the upper cap.

In an embodiment, a transfer rail and a transfer block reciprocally movable along the transfer rail are formed on a bottom surface of the radiation shielding chamber, and the reactor is movable through the transfer block.

In an embodiment, an auxiliary hole is formed in the bottom surface of the inner space of the radiation shielding chamber, and the apparatus further comprises an auxiliary bracket including a lower auxiliary cap covering a lower part of the auxiliary hole and having a lower hole formed in a bottom surface thereof, and an upper auxiliary cap covering an upper part of the auxiliary hole and having a side opening formed in a side surface thereof.

In an embodiment, the side opening of the upper auxiliary cap is formed on a side surface thereof opposite to a direction corresponding to the partition wall.

According to another embodiment of the present disclosure, there is provided an apparatus for synthesizing nanoparticles including: a radiation shielding chamber having a partition wall dividing an inner space thereof, and an opening and an auxiliary hole formed on a bottom surface of the inner space; an electron beam irradiator formed in the inner space of one side of the partition wall; a reactor formed in the inner space of another side of the partition wall; a cable bracket including a lower cap, which has a lower opening formed therein and covers a lower part of the opening, and an upper cap, which has an upper opening formed therein and covers an upper part of the opening; and an auxiliary bracket including a lower auxiliary cap, which has a lower opening formed on a bottom surface thereof and covers a lower part of the auxiliary hole, and an upper auxiliary cap, which has a side opening formed on a side surface thereof opposite to a direction corresponding to the partition wall and covers an upper part of the auxiliary hole, wherein the cable bracket and the auxiliary bracket are formed of lead or a metal material containing lead.

In an embodiment, the cable bracket has at least two vertical plates formed of lead or a metal material containing lead between the lower cap and the upper cap.

In an embodiment, a lower insertion groove is formed on the lower cap, an upper insertion groove is formed on the upper cap, and a lower shielding bar and an upper shielding bar are inserted into the lower insertion groove and the upper insertion groove, respectively.

In an embodiment, the lower shielding bar and the upper shielding bar are each formed as a lead block having an outer surface surrounded by an iron plate.

In an embodiment, the cable bracket includes a guide cap formed on an upper part of the upper cap, and the guide cap is formed of lead or a metal material containing lead.

In an embodiment, one or more exhaust holes are formed on a top surface of the radiation shielding chamber, and the apparatus further comprises an exhaust unit including a lower exhaust bracket covering a lower side of the exhaust hole, an upper exhaust bracket covering an upper side of the exhaust hole, and a middle plate vertically dividing an inner space of the upper exhaust bracket.

BRIEF DESCRIPTION OF THE DRAWINGS

FIGS. 15 to 17 are a table and graphs showing results of X-ray powder diffraction (XRD) of catalysts for a fuel cell, which were prepared under the same conditions except for only a time period of electron beam irradiation.

FIGS. 18 to 20 are a table and graphs showing results of electrochemical evaluation (oxygen reduction reaction (ORR)) of catalysts for a fuel cell, which were prepared under the same conditions except for only a time period of electron beam irradiation.

DETAILED DESCRIPTION

Hereinafter, preferred embodiments of the present disclosure will be described in detail with reference to the accompanying drawings only to provide those of skill in the art with a thorough understanding of the present disclosure.

Figure 1:
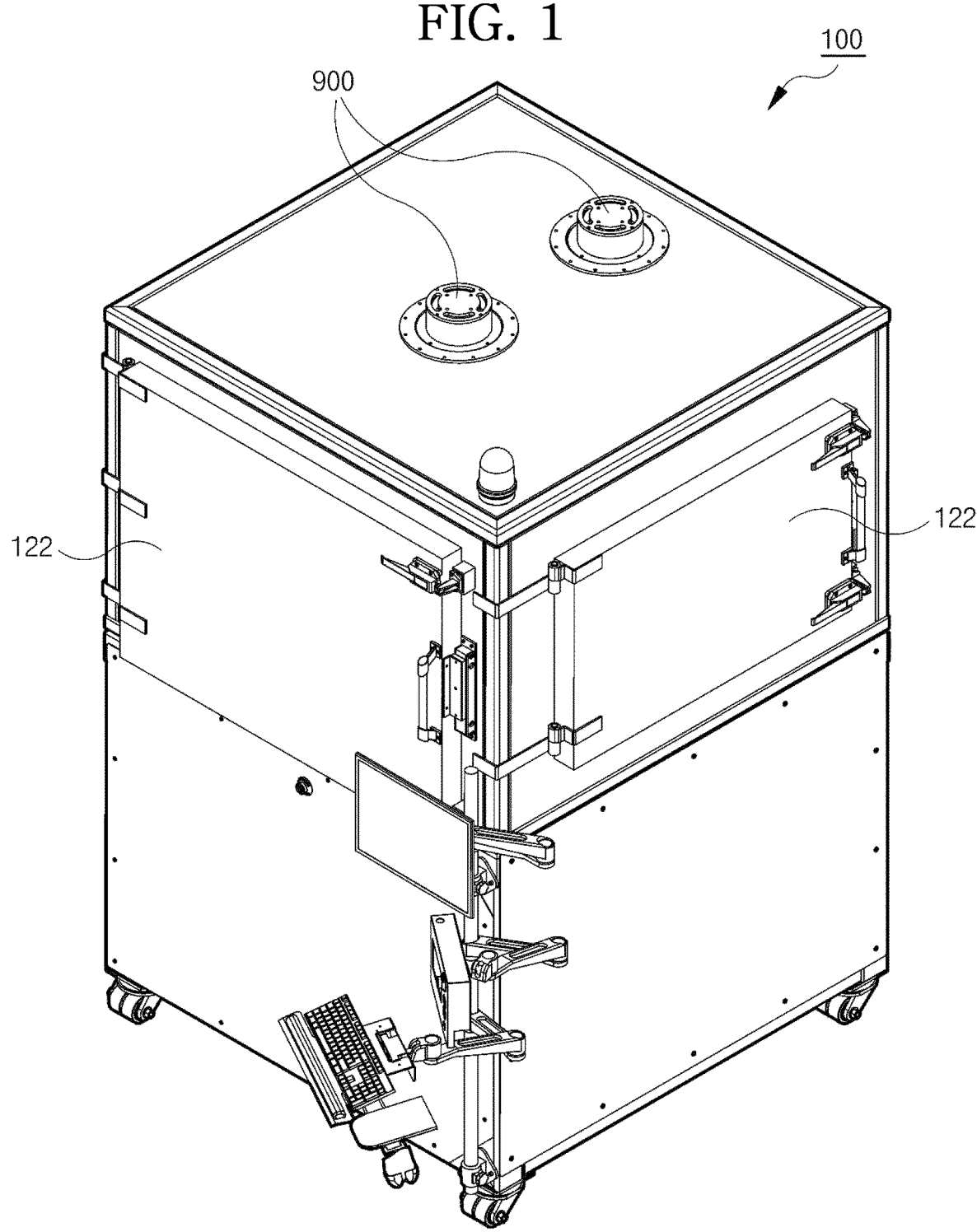
FIG. 1 is a perspective view of an apparatus for synthesizing nanoparticles according to an embodiment of the present disclosure.
Figure 2:
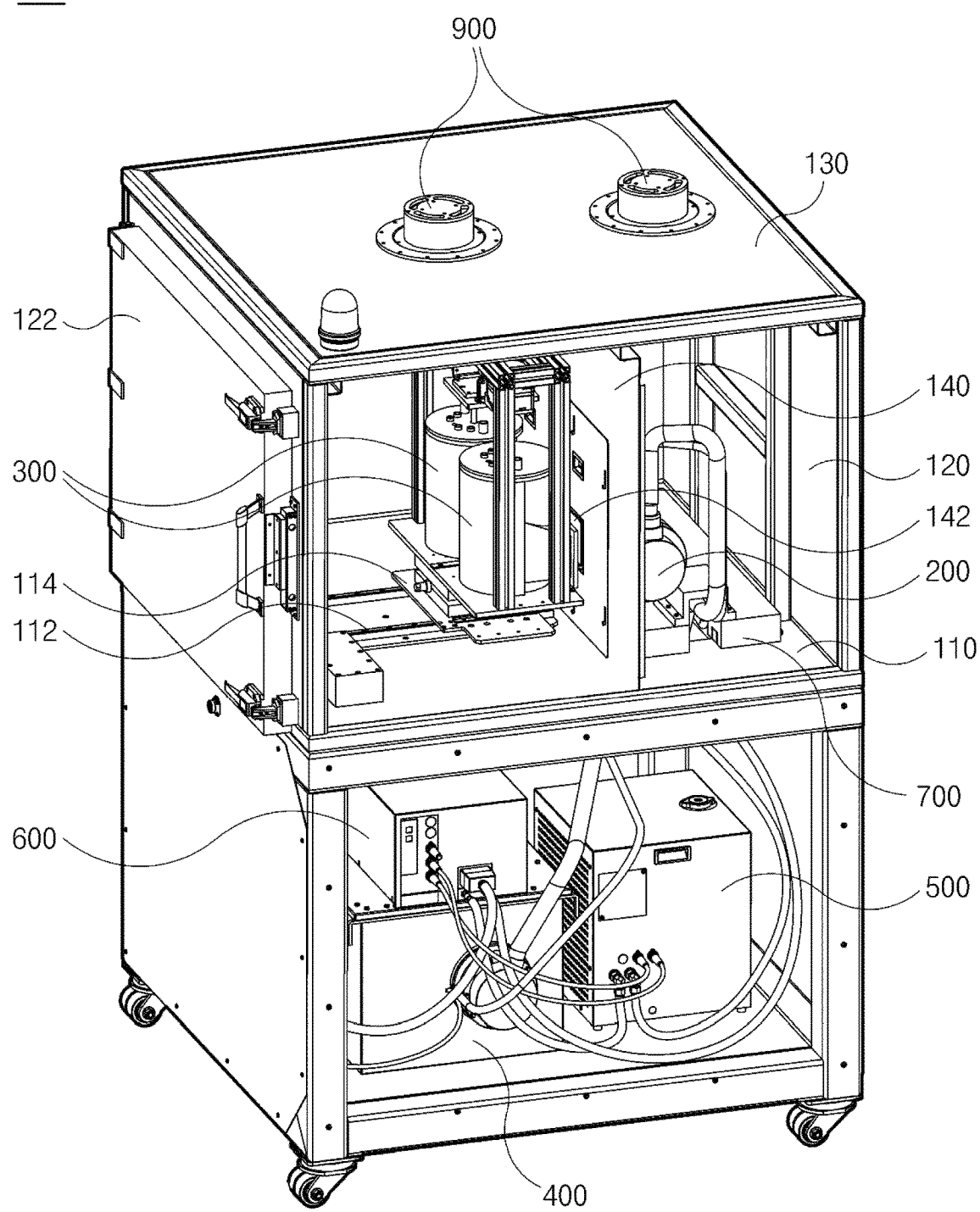
FIG. 2 is a perspective view illustrating an internal configuration of an apparatus for synthesizing nanoparticles.
Figure 3:
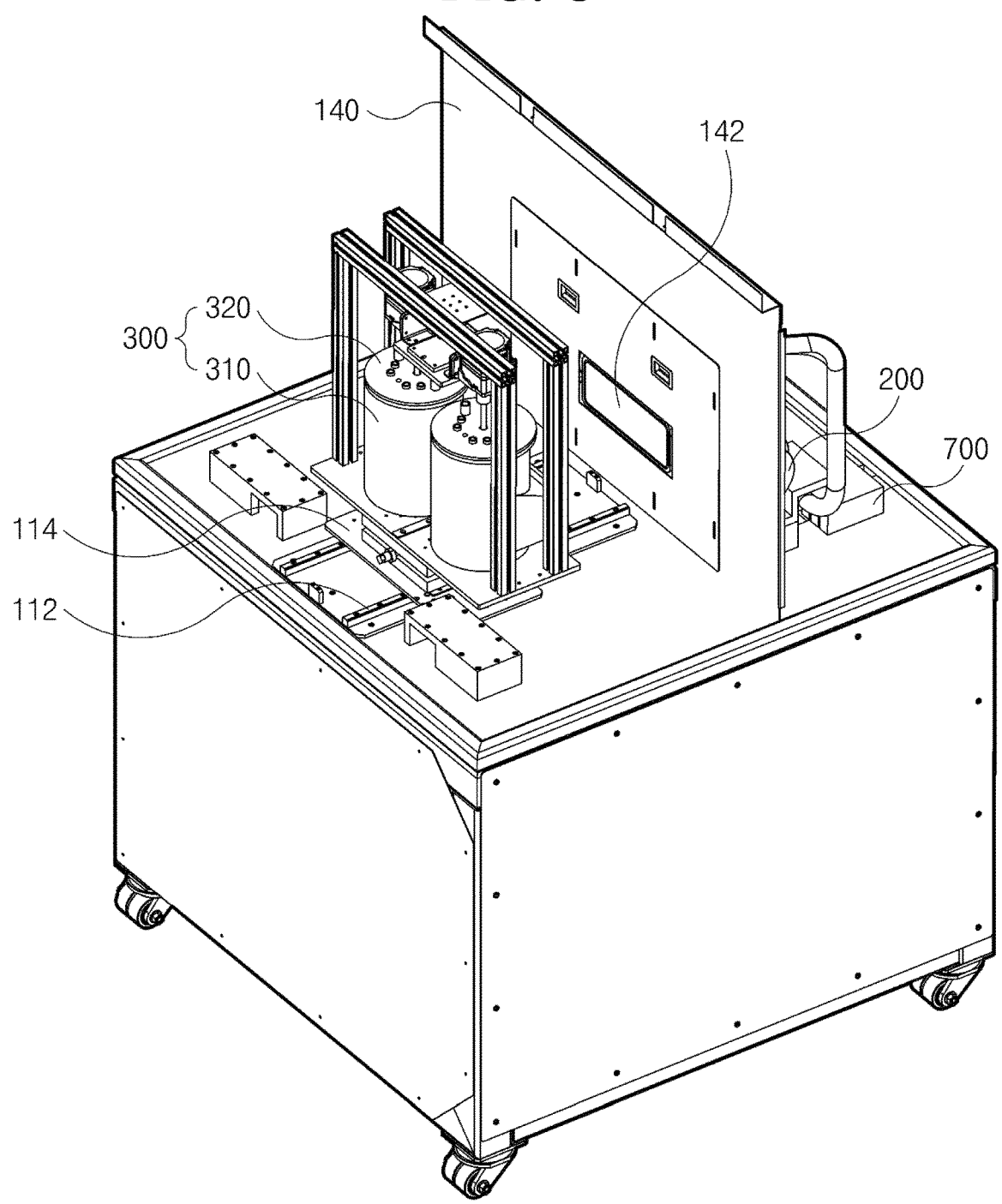
FIGS. 3 and 4 are perspective views illustrating an arrangement structure of an electron beam irradiator and a reactor.
Figure 4:
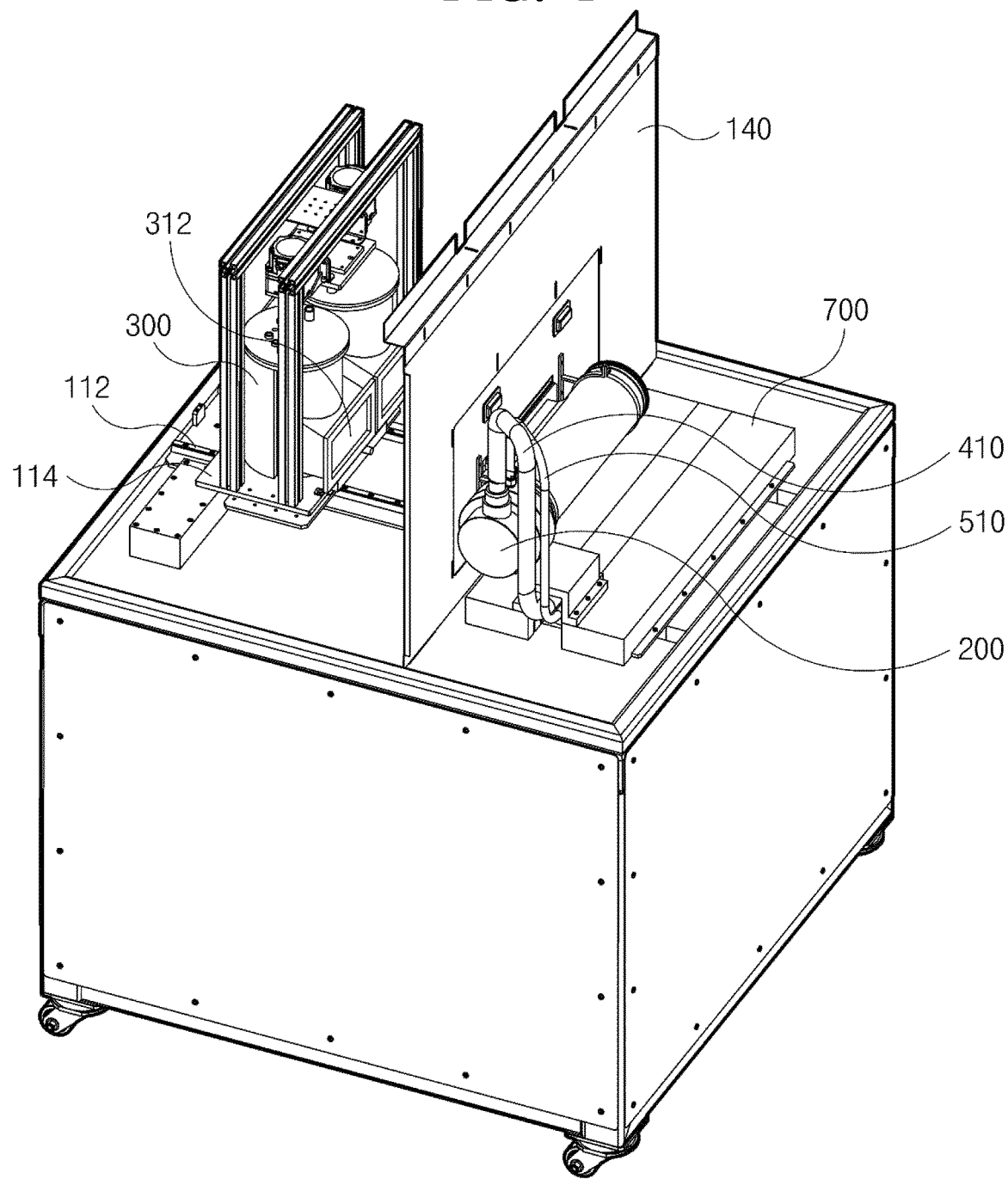

FIG. 1 is a perspective view of an apparatus for synthesizing nanoparticles according to an embodiment of the present disclosure, FIG. 2 is a perspective view illustrating an internal configuration of the apparatus for synthesizing nanoparticles, and FIGS. 3 and 4 are perspective views illustrating an arrangement structure of an electron beam irradiator and a reactor.

The apparatus for synthesizing nanoparticles according to an embodiment of the present disclosure is an apparatus for irradiating, with an electron beam, a solution containing a raw material of nanoparticles (hereinafter, referred to as a 'nanoparticle aqueous solution') to activate electrons in the nanoparticle aqueous solution, and converting a sample into uniform nanoparticles in a short time as the electrons having high reactivity cause a reduction, and includes, as basic components, a radiation shielding chamber 100, which includes a bottom plate 110, a side plate 120, and a top plate 130 to provide an inner space and further includes a partition wall 140 installed to divide the inner space into a front inner space and a rear inner space and provided with a transmission window 142 capable of transmitting an electron beam, an electron beam irradiator 200 installed in the rear inner space of the radiation shielding chamber 100 to emit an electron beam toward the front inner space of the radiation shielding chamber 100 through the transmission window 142, a reactor 300 formed in the shape of a container to be filled with a nanoparticle aqueous solution and installed in the front inner space of the radiation shielding chamber 100 to receive the electron beam emitted from the electron beam irradiator 200, a power source unit 400 installed outside the radiation shielding chamber 100 to supply power to the electron beam irradiator 200 through a high-voltage cable 410 penetrating an opening 116 formed on the bottom plate 110, a chiller 500 installed outside the radiation shielding chamber 100 to transfer a refrigerant material to the electron beam irradiator 200 through a cooler pipe 510 penetrating the opening 116 formed on the bottom plate 110, and a control unit 600 to control the operation of each of the components.

The reactor 300 includes a container body 310 to accommodate a nanoparticle aqueous solution therein, and a container cover 320 coupled to the container body 310 to cover an upper opening thereof. In an embodiment, a container window 312 through which an electron beam may be transmitted is provided at a part of the container body 310 corresponding to the transmission window 142, and thus the electron beam emitted from the electron beam irradiator 200 may reach the nanoparticle aqueous solution accommodated in the container body 310 through the transmission window 142 of the partition wall 140 and the container window 312.

Meanwhile, a large amount of radiation is generated in the radiation shielding chamber 100 when nanoparticles are produced by irradiating an electron beam, and the apparatus for synthesizing nanoparticles is characterized in that the opening 116 is covered by a cable bracket 700 such that the radiation is prevented from leaking out through the opening 116 formed on the bottom plate 110.

The cable bracket 700 is made of lead or a metal material containing lead, and thus, as the opening 116 is formed to be covered by the separate cable bracket 700 as described above, radiation in the radiation shielding chamber 100 may be prevented from leaking out through the opening 116. In an embodiment, a detailed configuration of the cable bracket 700 will be described in detail with reference to some drawings below.

Meanwhile, the apparatus for synthesizing nanoparticles is further characterized in that the reactor 300 in which a nanoparticle aqueous solution is accommodated is movably mounted inside the radiation shielding chamber 100, rather than being fixedly coupled to the inside of the radiation shielding chamber 100.

That is, a transfer rail 112 extending in the forward and backward directions (i.e., the direction toward or away from the partition wall 140) may be provided on the bottom plate 110 in the front inner space of the radiation shielding chamber 100, and a transfer block 114 on which the reactor 300 is seated may be further provided to reciprocate along the transfer rail 112 to transfer the reactor 300.

When the reactor 300 is formed to be movable in the forward and backward directions as described above, the reactor 300 may be brought into close contact with the partition wall 140 as illustrated in FIG. 2 to allow an electron beam to be more smoothly delivered to the nanoparticle aqueous solution, and when maintenance and repair of the inside of the radiation shielding chamber 100 are required, the reactor 300 may be moved away from the partition wall 140 as illustrated in FIGS. 3 and 4 to facilitate the maintenance and repair. In an embodiment, an opening and closing door 122 may need to be provided on the side plate 120 to allow an operator to easily perform maintenance and repair of the inside of the radiation shielding chamber 100.

Figure 5:
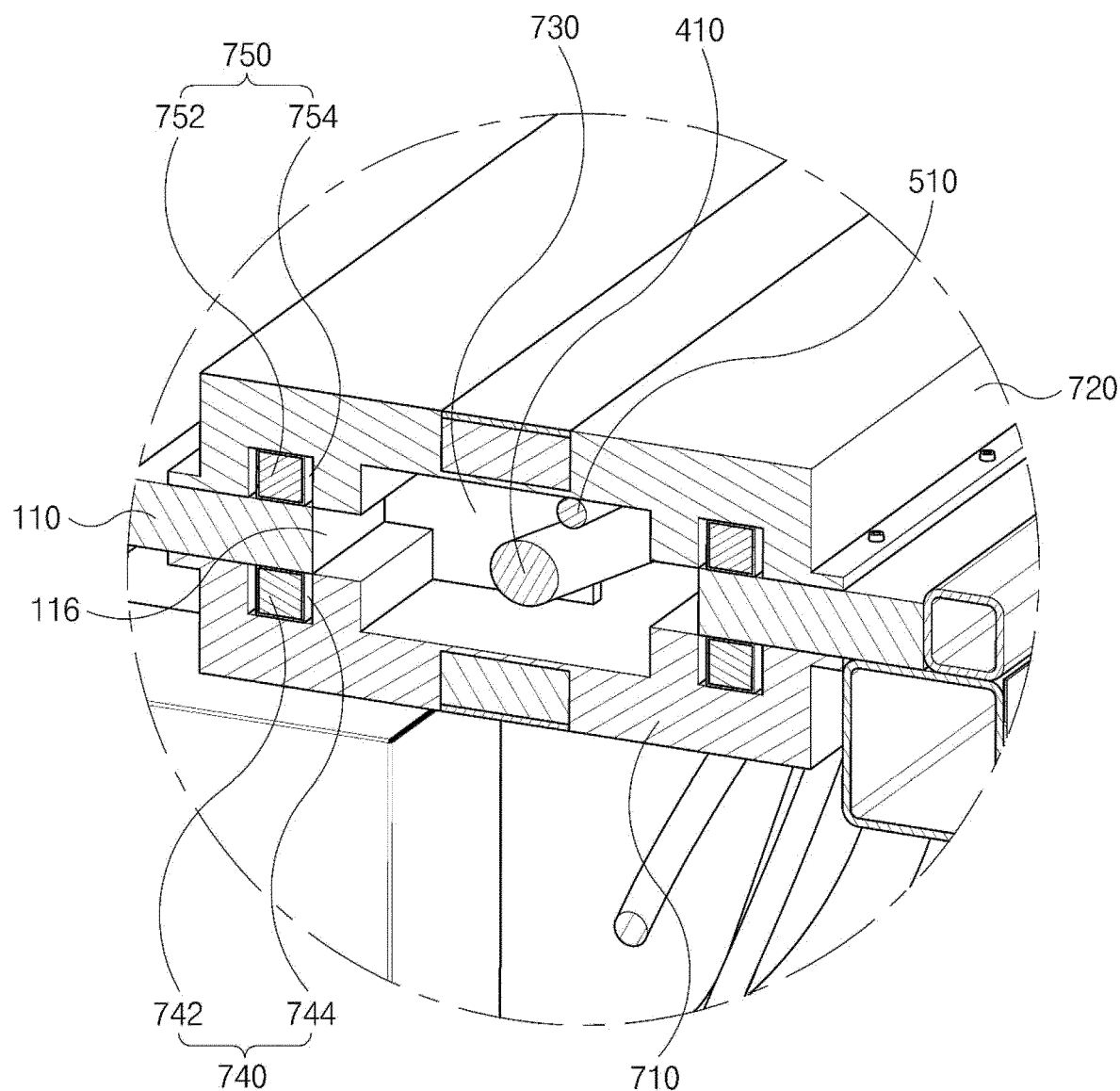
FIG. 5 is a cross-sectional perspective view of a cable bracket included in an apparatus for synthesizing nanoparticles.
Figure 6:
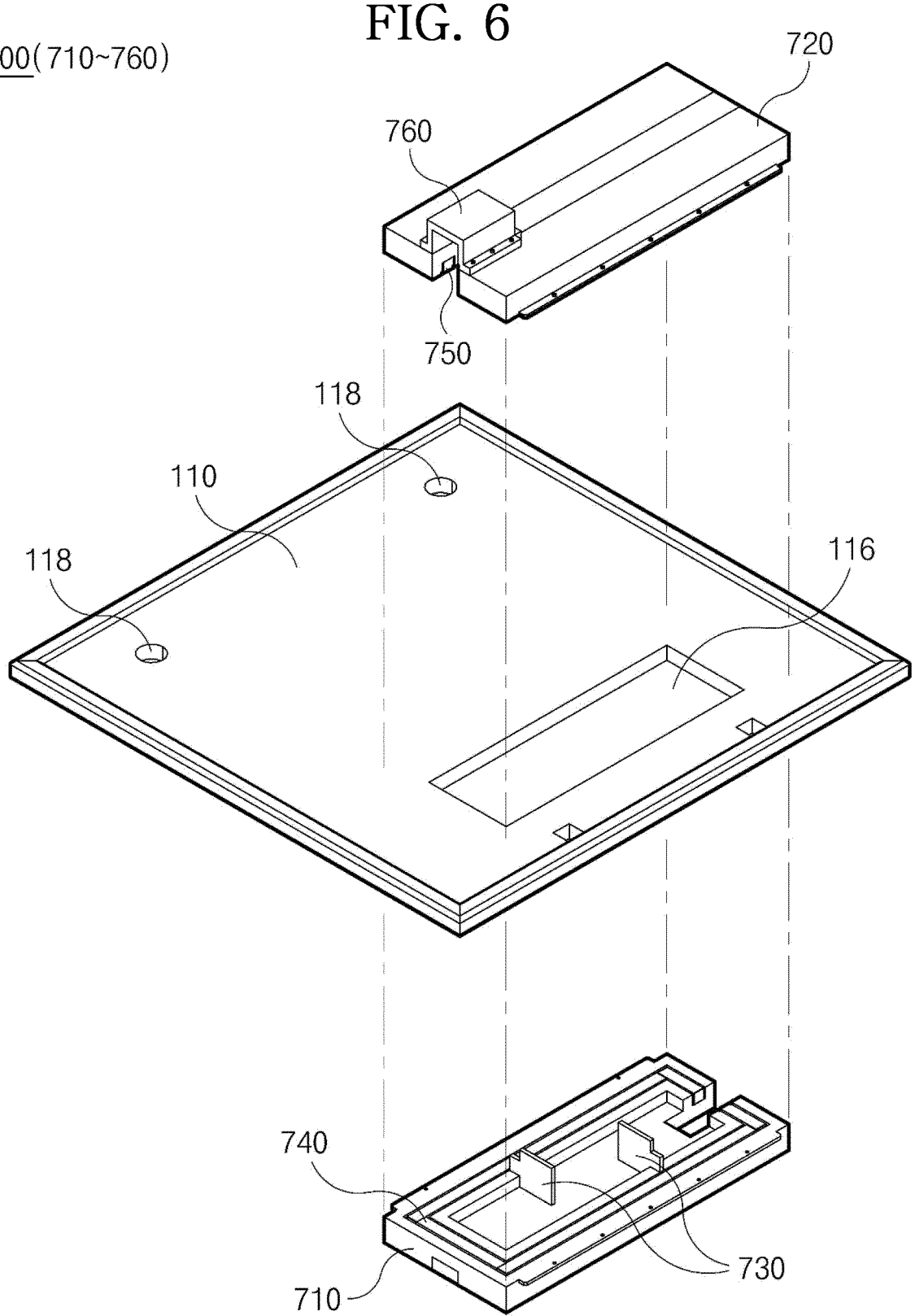
FIG. 6 illustrates a coupling structure of a cable bracket included in an apparatus for synthesizing nanoparticles.
Figure 7:
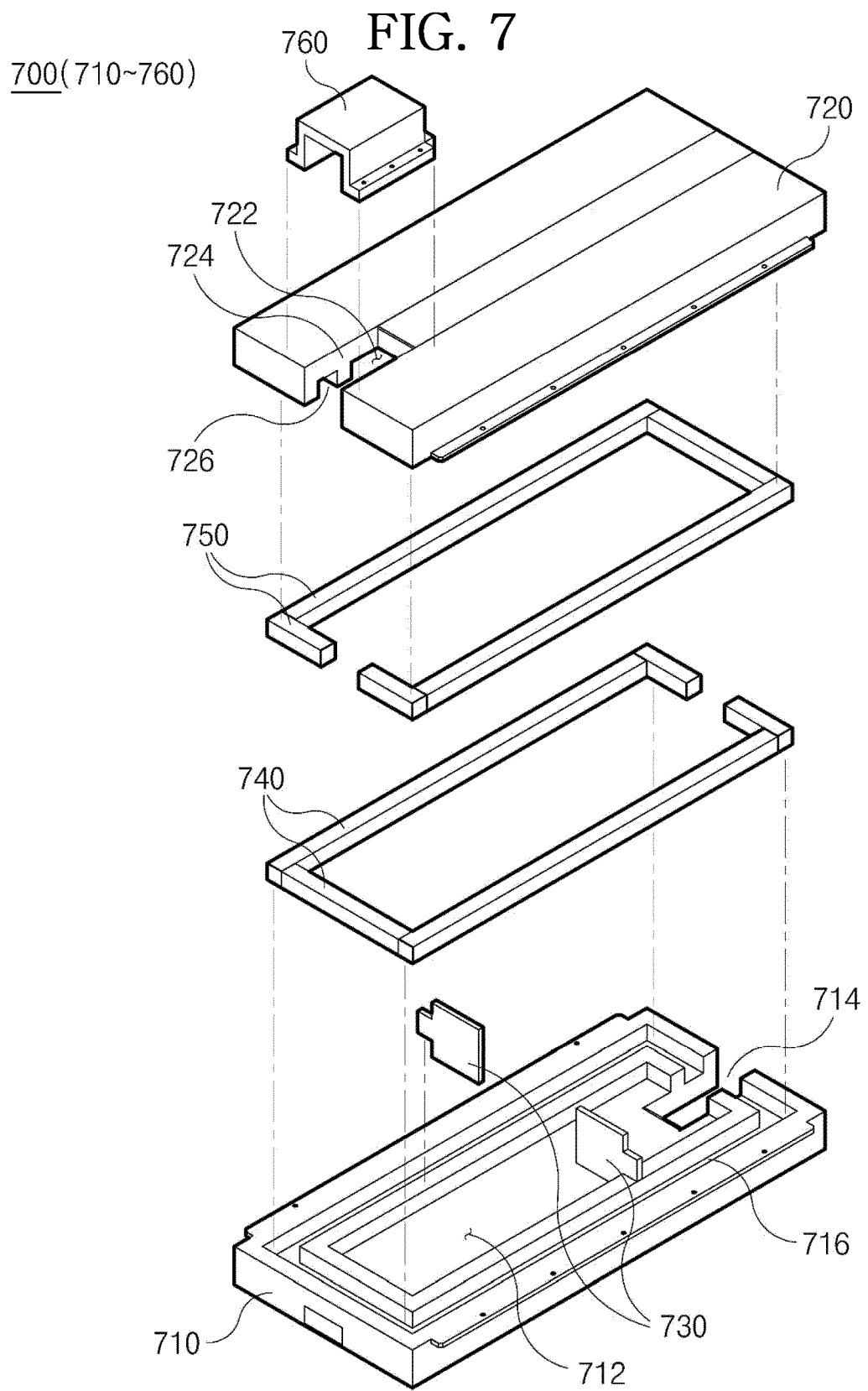
FIG. 7 is an exploded perspective view of a cable bracket included in an apparatus for synthesizing nanoparticles.
Figure 8:
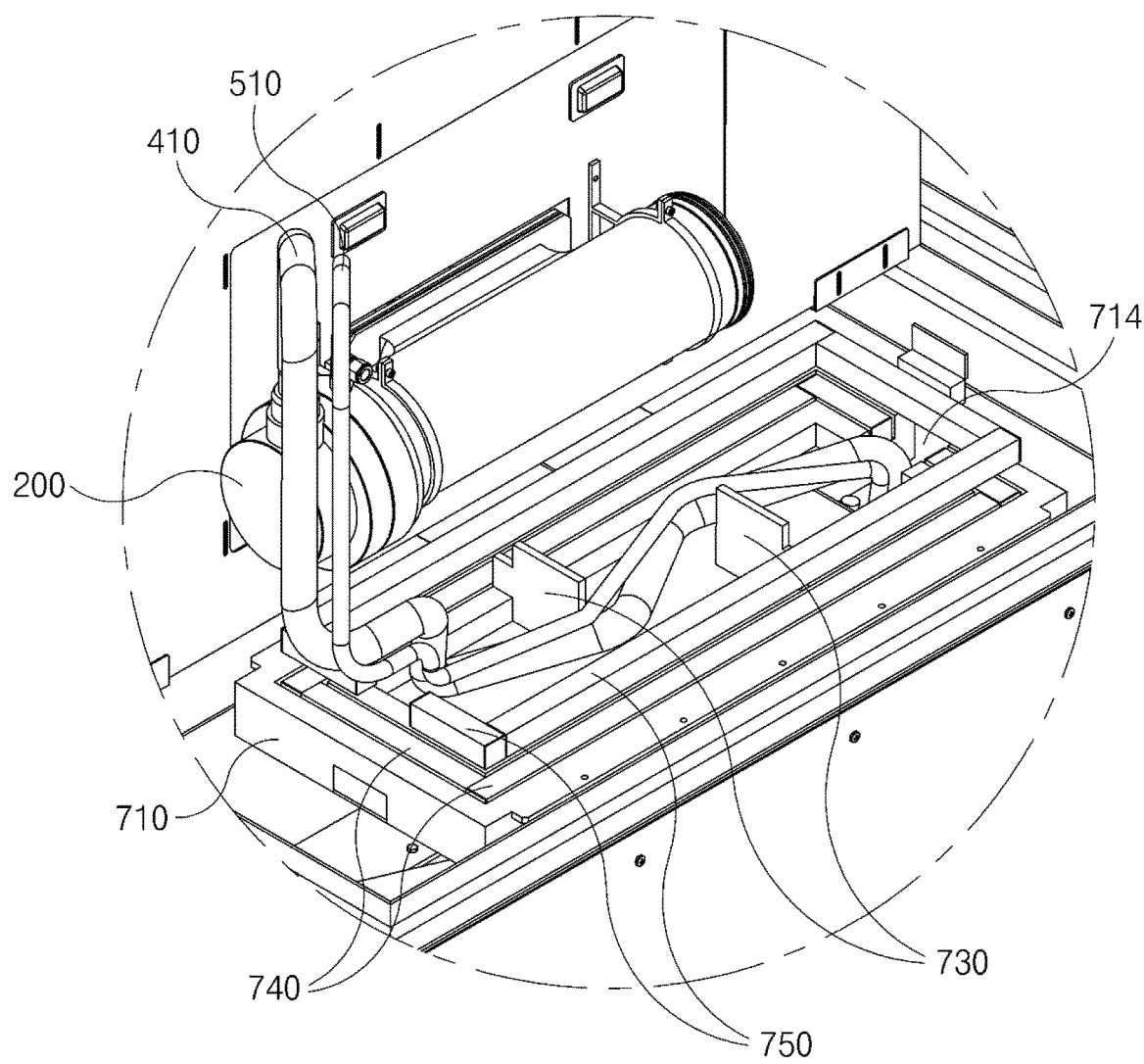
FIG. 8 illustrates an arrangement structure of a high-voltage cable and a cooler pipe inside a cable bracket included in an apparatus for synthesizing nanoparticles.

FIG. 5 is a cross-sectional perspective view of the cable bracket 700 included in the apparatus for synthesizing nanoparticles, FIG. 6 illustrates a coupling structure of the cable bracket 700 included in the apparatus for synthesizing nanoparticles, FIG. 7 is an exploded perspective view of the cable bracket 700 included in the apparatus for synthesizing nanoparticles, and FIG. 8 illustrates an arrangement structure of the high-voltage cable 410 and the cooler pipe 510 inside the cable bracket 700 included in the apparatus for synthesizing nanoparticles.

The apparatus for synthesizing nanoparticles is characterized in that the lower side and the upper side of the opening 116 are formed to be blocked by the cable bracket 700 so as to minimize leakage of radiation through the opening 116.

The cable bracket 700 includes a lower cap 710 formed to have a lower inner space 712 having an open upper side and thus to cover the lower side of the opening 116, and an upper cap formed to have an upper inner space 722 having an open lower side and thus to cover an upper side of the opening 116. In an embodiment, in a structure in which the opening 116 is formed in the shape of a circular through-hole and the cable bracket 700 is formed to simply cover the opening 116, radiation may not be effectively prevented from leaking out through the opening 116.

Therefore, it is preferable that the opening 116 is elongated in the left-right direction of the bottom plate 110, and the lower cap 710 and the upper cap are elongated in the longitudinal direction of the opening 116. In an embodiment, the lower cap 710 has a lower opening 714 formed at a part corresponding to one end of the opening 116 in the longitudinal direction thereof, and the upper cap has an upper opening 724 formed at a part corresponding to the other end of the opening 116 in the longitudinal direction thereof. Therefore, the high-voltage cable 410 and the cooler pipe 510, which are introduced from the outside of the radiation shielding chamber 100 to the inside thereof, are introduced into the cable bracket 700 through the lower opening 714, extend in the longitudinal direction of the opening 116, and then are drawn out of the cable bracket 700 through the upper opening 724 to be connected to the electron beam irradiator 200.

As described above, because the cable bracket 700 is formed such that the lower opening 714 into which the high-voltage cable 410 and the cooler pipe 510 are introduced and the upper opening 724 from which the high-voltage cable 410 and the cooler pipe 510 are drawn out are separated from each other as far as possible, it is advantageous in that, even when a certain amount of radiation is introduced into the cable bracket 700 through the upper opening 724, the radiation may be prevented from leaking out of the radiation shielding chamber 100 through the lower opening 714.

Meanwhile, the cable bracket 700 may include two or more vertical plates 730 erected alternately on one width-direction sidewall and the other width-direction sidewall of the upper inner space 722 and the lower inner space 712 to prevent the radiation introduced into the cable bracket 700 through the upper opening 724 from traveling straight toward the lower opening 714. In an embodiment, the vertical plates 730 may need to be made of lead or a metal material containing lead to prevent radiation from transmitting therethrough.

As described above, in a structure in which two or more vertical plates 730 are provided inside the cable bracket 700, as illustrated in FIG. 8, the high-voltage cable 410 and the cooler pipe 510 pass through the inner spaces 712 and 722 of the cable bracket 700 in a zigzag pattern, and radiation introduced into the cable bracket 700 is also blocked by the vertical plates 730, thus travels in a zigzag pattern, and thus is prevented from easily leaking out of the cable bracket 700.

Meanwhile, in order to prevent the radiation introduced into the cable bracket 700 from passing through the cable bracket 700, it is preferable that the entire cable bracket 700 is made of lead. However, when the entire cable bracket 700 is made of lead, the structural strength of the cable bracket 700 may be reduced, and thus, the cable bracket 700 may be easily deformed upon an external impact or vibration being applied thereto, and the manufacturing costs of the cable bracket 700 may increase.

Accordingly, when the entire cable bracket 700 is not made of lead, a component having a radiation shielding property may be inserted into the cable bracket 700 such that radiation does not easily pass through the cable bracket 700. For example, a lower insertion groove 716 may be formed on the top surface of the lower cap 710 to surround a region through which the high-voltage cable 410 and the cooler pipe 510 pass, an upper insertion groove 726 may be formed on the bottom surface of the upper cap to surround a region through which the high-voltage cable 410 and the cooler pipe 510 pass, and a lower shielding bar 740 and an upper shielding bar 750, which are made of lead or a material containing lead, may be inserted into the lower insertion groove 716 and the upper insertion groove 726, respectively.

When the lower shielding bar 740 and the upper shielding bar 750 are inserted into the lower cap 710 and the upper cap, respectively, as described above, it is advantageous in that the transmission of radiation may be effectively prevented even when the entire lower cap 710 and the entire upper cap are not made of lead.

In an embodiment, when the lower shielding bar 740 and the upper shielding bar 750 are entirely formed of only lead, the structural strength may be reduced and thus they may be easily deformed. Therefore, it is preferable that the lower shielding bar 740 and the upper shielding bar 750 are formed as lead blocks 742 and 752 having outer surfaces surrounded by iron plates 744 and 754, respectively. Of course, in order to further increase the radiation transmission prevention efficiency, the lower cap 710 and the upper cap may be entirely formed into lead blocks covered with steel plates, respectively.

When the upper opening 724 formed on the upper cap is kept completely open, radiation generated in the radiation shielding chamber 100 may be easily introduced into the upper cap through the upper opening 724. Therefore, it is preferable that a guide cap 760 is additionally provided on the top surface of the upper cap to be coupled thereto to cover an upper part of the upper opening 724. In an embodiment, the guide cap 760 is formed to have an inner space open laterally along the longitudinal direction of the opening 116 rather than being open upward, and thus the high-voltage cable 410 and the cooler pipe 510 are drawn out through the upper opening 724 in the longitudinal direction of the opening 116. Of course, it is preferable that the guide cap 760 is also made of lead or a metal material containing lead to prevent radiation from being transmitted therethrough.

As described above, when the guide cap 760 is mounted on the upper cap, radiation in the radiation shielding chamber 100 has to pass through a path that is bent several times in order to be introduced into the cable bracket 700, and thus it is advantageous in that leakage of radiation is effectively prevented.

Figure 9:
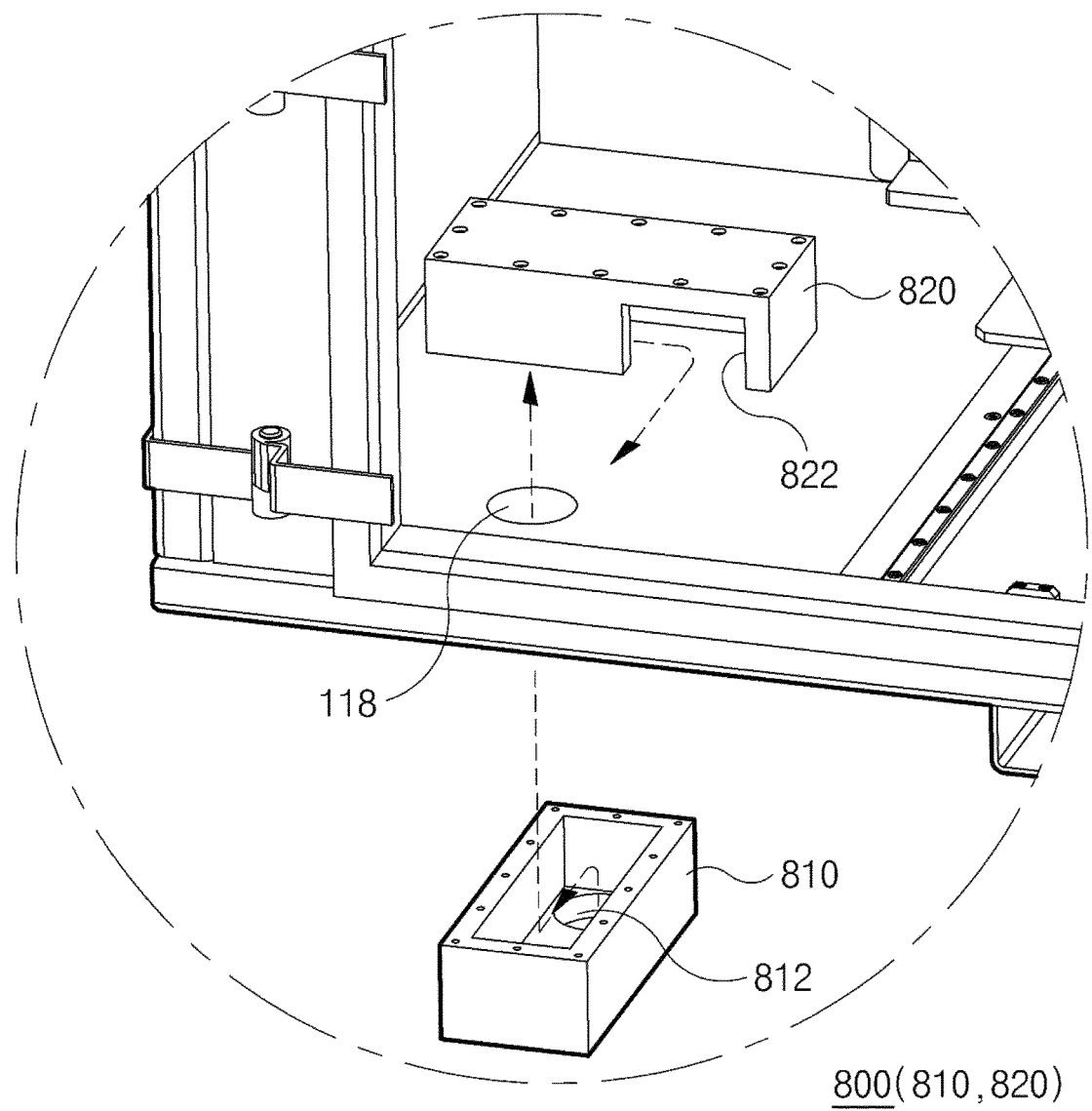
FIG. 9 illustrates a coupling structure of an upper auxiliary cap and a lower auxiliary cap.

FIG. 9 illustrates a coupling structure of an upper auxiliary cap 820 and a lower auxiliary cap 810.

One or more auxiliary holes 118 are formed on the bottom plate 110 in the front inner space of the radiation shielding chamber 100 to supply a material, for example, the nanoparticle aqueous solution, gas or the like, to the reactor 300, and when the auxiliary holes 118 remain open as they are, radiation in the radiation shielding chamber 100 may easily leak out through the auxiliary holes 118.

Therefore, it is preferable that the auxiliary holes 118 are formed to be covered by the lower auxiliary cap 810 and the upper auxiliary cap 820. The lower auxiliary cap 810 is formed to have an inner space, which is open at the upper side and extends in the front-rear direction of the bottom plate 110, and is mounted on the bottom surface of the bottom plate 110, and the upper auxiliary cap 820 is formed to have an inner space, which is open at the lower side and extends in the left-right direction of the bottom plate 110, and is mounted on the top surface of the bottom plate 110.

In an embodiment, a lower hole 812 is formed on the bottom surface of the lower auxiliary cap 810, a side opening 822 is formed on a sidewall of the upper auxiliary cap 820, and thus a supply pipe for supplying a material to the reactor 300 is inserted into the lower hole 812, passes through the auxiliary hole, and is then connected to the reactor 300 through the side opening 822. In an embodiment, when the side opening 822 is positioned to face the partition wall 140 toward which an electron beam is emitted, a problem occurs in that the amount of radiation introduced into the side opening 822 is significantly large. Therefore, it is preferable that the side opening 822 is formed on a sidewall of the upper auxiliary cap 820 opposite to the sidewall facing the partition wall 140.

Further, in order to form a pattern in which a path passing through an auxiliary bracket 800 is bent several times, the lower auxiliary cap 810 may be mounted such that one side of the inner space thereof in the longitudinal direction covers the lower side of the auxiliary hole, the lower hole 812 may be formed at a part corresponding to the other side of the inner space of the lower auxiliary cap 810 in the longitudinal direction, the upper auxiliary cap 820 may be mounted such that one side of the inner space thereof in the longitudinal direction covers the upper side of the auxiliary hole, and the upper opening 724 may be formed at a part corresponding to the other side of the inner space of the upper auxiliary cap 820 in the longitudinal direction.

When the auxiliary bracket 800 is formed as described above, the path passing through the auxiliary bracket 800 has a pattern bent several times as indicated by the dotted arrows illustrated in FIG. 9, and thus it is advantageous in that radiation in the radiation shielding chamber 100 is unable to easily pass through the inside of the auxiliary bracket 800, that is, leakage of radiation may be effectively prevented.

Figure 10:
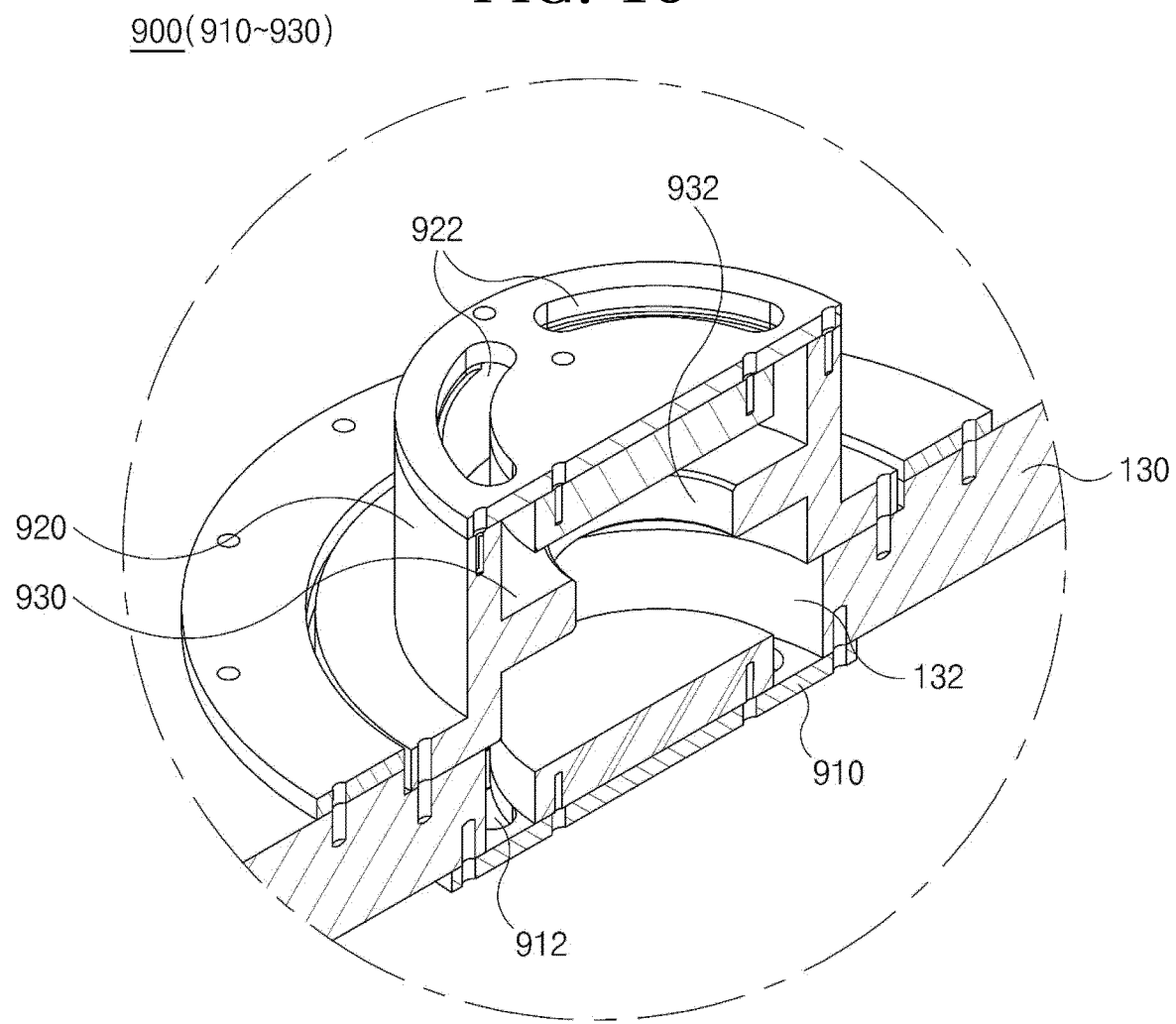
FIG. 10 is a cross-sectional perspective view of an exhaust unit included in an apparatus for synthesizing nanoparticles.

FIG. 10 is a cross-sectional perspective view of an exhaust unit 900 included in the apparatus for synthesizing nanoparticles.

An exhaust hole 132 is formed on the top plate 130 to allow air in the radiation shielding chamber 100 to be discharged to the outside. In an embodiment, a large amount of ozone may be generated in a process of synthesizing nanoparticles by using an electron beam, and when the ozone is discharged through the exhaust hole 132 as it is, air pollution may occur.

Therefore, the apparatus for synthesizing nanoparticles may be provided with the exhaust unit 900 mounted on the exhaust hole 132 to prevent leakage of ozone while improving an exhaust flow passing through the exhaust hole 132.

As illustrated in FIG. 10, the exhaust unit 900 includes a lower exhaust bracket 910 mounted to cover the lower side of the exhaust hole 132 and having a lower side hole 912 formed at a part thereof corresponding to the edge of the exhaust hole 132, an upper exhaust bracket 920, which is formed to have an inner space having an open lower side, is mounted to cover the upper side of the exhaust hole 132, and has an upper side hole 922 formed at a part of the top surface thereof corresponding to the edge of the exhaust hole 132, and a middle plate 930 mounted to horizontally divide the inner space of the upper exhaust bracket 920 and having a center hole 932 formed at a part thereof corresponding to the center of the exhaust hole 132.

In a structure in which the exhaust unit 900 is mounted on the exhaust hole 132 as described above, gas in the radiation shielding chamber 100 is introduced into the exhaust unit 900 through the lower side hole 912 of the lower exhaust bracket 910, flows toward the central axis of the exhaust hole 132 to pass through the center hole 932, then flows toward the edge of the exhaust hole 132, and is discharged to the outside through the upper side hole 922 of the upper exhaust bracket 920. As described above, in order for the gas in the radiation shielding chamber 100 to be exhausted through the exhaust hole 132, the gas has to pass through a flow path that is bent several times, and ozone that is heavier than air is sunk down while passing through the bent flow path, and thus ozone may be prevented from leaking out.

Figure 11:
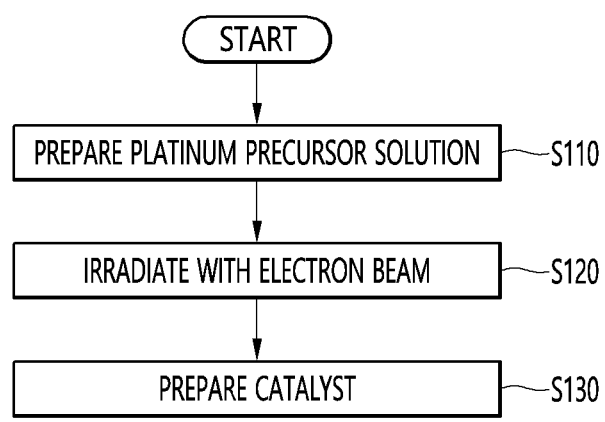
FIG. 11 is a flowchart illustrating a method of preparing a catalyst for a fuel cell by using an apparatus for synthesizing nanoparticles according to an embodiment of the present disclosure.

FIG. 11 is a flowchart illustrating a method of preparing a catalyst for a fuel cell by using the apparatus for synthesizing nanoparticles according to an embodiment of the present disclosure.

As illustrated in FIG. 11, the method of preparing a catalyst for a fuel cell by using the apparatus for synthesizing nanoparticles according to an embodiment of the present disclosure includes preparing a platinum precursor solution (S110), irradiating with an electron beam (S120), and preparing a catalyst (S130).

The preparing of the platinum precursor solution (S110) includes preparing a catalyst support, mixing the catalyst support with a mixed solvent (a second mixed solvent) in which alcohol and distilled water are mixed and dispersing the mixture to prepare a dispersed solvent, and dissolving a platinum precursor in the dispersed solvent in the same ratio as that of the catalyst support and stirring the product to prepare the platinum precursor solution.

A process of preparing the catalyst support will be described with reference to FIG. 12.

Figure 12:
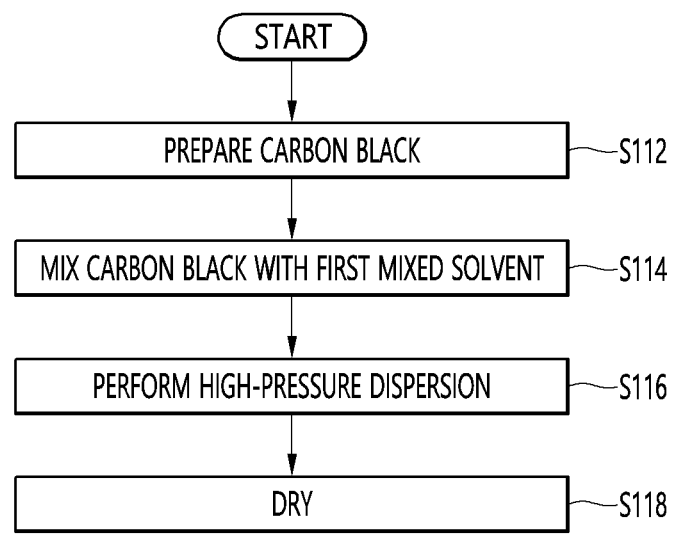
FIG. 12 is a flowchart illustrating a process of preparing a catalyst support.

As illustrated in FIG. 12, in order to prepare the catalyst support, first, carbon black is prepared (S112). The carbon black may be highly-crystalline carbon black having an average particle size of 30 $\mu$m to 80 $\mu$m. The carbon black may be commercially available carbon black.

Next, the carbon black is mixed with a first mixed solvent in which alcohol and distilled water are mixed in a mixing ratio of 1:1 (S114). The first mixed solvent may be prepared by mixing 5 $\ell$ of alcohol with 5 $\ell$ of distilled water, and the carbon black may be mixed with the first mixed solvent in a ratio of 100 g of the carbon black to 10 $\ell$ of the first mixed solvent.

Next, high-pressure dispersion is performed by using carbon dioxide gas (S116). That is, circulating dispersion is performed on the carbon black mixed with the first mixed solvent by using a high-pressure disperser that is fully charged with carbon dioxide gas, to prepare a catalyst support having an average particle size of 2 $\mu$m to 10 $\mu$m. In an embodiment, the injection pressure of the carbon dioxide gas in the high-pressure disperser may be 500 bar to 1500 bar, and the supply flow rate of the carbon dioxide gas may be 400 m$\ell$/min to 600 m$\ell$/min (preferably, 500 m$\ell$/min).

The injection pressure and the supply flow rate are to cause the average particle size of the carbon black to be reduced and uniform through the circulating dispersion of the carbon black, and to increase the formation of mesopores to achieve optimal conditions when the carbon black is used as a catalyst support for a fuel cell, and are defined through a plurality of experiments. When the injection pressure and the supply flow rate are out of the aforementioned ranges, the carbon black may not be in the optimal conditions for use as a catalyst support, for example, the carbon black may deteriorate in mechanical strength or may be easily broken, and the formation of new mesopores may decrease.

Carbon dioxide gas corrodes and breaks carbon black, and thus, when high-pressure dispersion is performed, the average particle size of the carbon black becomes reduced and uniform, and the carbon black is separated to increase the formation of mesopores. In general, typical carbon black has pores having diameters of 10 nm and 70 nm, and when the high-pressure dispersion is performed by using carbon dioxide gas as described above, the number of pores having a diameter of 10 nm decreases, the number of pores having a diameter of 70 nm or greater increases, and in particular, the formation of new mesopores having a diameter of 25 nm increases due to the separation of carbon black.

Such new mesopores have an effect of reducing oxygen diffusion resistance and improving uniform ionomer coating properties when supporting a catalyst, and thus may enable optimal conditions for use as a catalyst support for a fuel cell.

In addition, it is possible to adjust the pore distribution by adjusting the injection pressure of carbon dioxide gas to be within a range of 500 bar to 1500 bar when performing the high-pressure dispersion.

Thereafter, it is possible to prepare a carbon catalyst support through a drying process to evaporate the first mixed solvent (S118).

The catalyst support may be prepared through the above-described process, but it is also possible to use a catalyst support prepared by performing a method well known to those of skill in the art.

Next, the preparing of the platinum precursor solution (S110) will be described with reference to FIG. 13.

Figure 13:
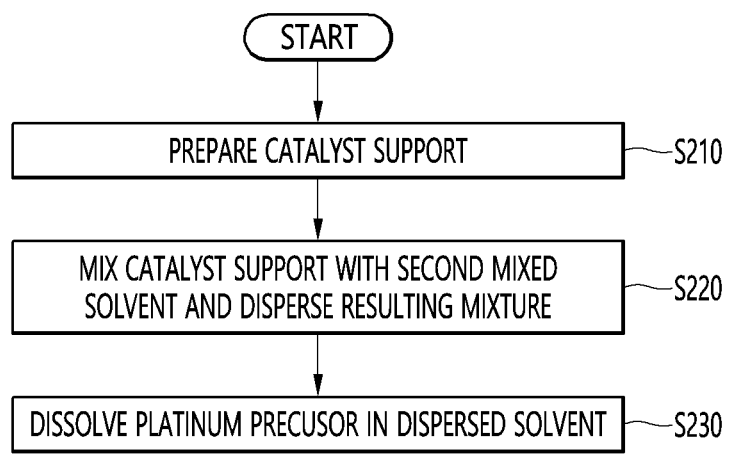
FIG. 13 is a flowchart of a process of preparing a platinum precursor solution.

As illustrated in FIG. 13, after the catalyst support is prepared (S210), the catalyst support is mixed with a second mixed solvent in which alcohol and distilled water are mixed, and the dispersed solvent is prepared by dispersing the mixture of the catalyst support and the second mixed solvent by using an ultrasonic disperser (S220).

The second mixed solvent may have a ratio of ethanol to distilled water of 1:0.5, and may be formed by mixing 3 $\ell$ of ethanol with 1.5 $\ell$ of distilled water. In addition, the catalyst support may be mixed with the second mixed solvent at a ratio of 5 g of the catalyst support to 4.5 $\ell$ of the second mixed solvent.

The dispersion using the ultrasonic disperser is performed for about an hour to improve dispersion efficiency.

Next, the platinum precursor solution is prepared by dissolving a platinum precursor in the dispersed solvent in the same ratio as that of the catalyst support and sufficiently stirring the resulting solution (S230). The platinum precursor may be $H_2PtCl_6$.

The catalyst support and the platinum precursor are mixed in a ratio of 50:50, for example, 5 g of the catalyst support is mixed with 5 g of the platinum precursor.

After the platinum precursor solution is prepared, as illustrated in FIG. 11, the irradiating with the electron beam (S120) is performed. That is, the above-described apparatus for synthesizing nanoparticles is prepared, then an electron beam is emitted by using the electron beam irradiator 200 in a state in which the platinum precursor solution is accommodated in the reactor 300 of the apparatus for synthesizing nanoparticles, and the platinum precursor solution is irradiated for a preset time period with the electron beam transmitted through the transmission window 142.

Meanwhile, as described above, in the irradiating with the electron beam (S120), the electron beam is emitted by using the electron beam irradiator 200 in a state in which the platinum precursor solution is accommodated in the reactor 300 of the apparatus for synthesizing nanoparticles, such that the platinum precursor solution is irradiated for a preset time period with the electron beam transmitted through the transmission window 142.

In an embodiment, the reactor 300 may have a capacity of 10 $\ell$, and the transmission window 142 may have dimensions of 200 mm in width, 120 mm in length, and 10 $\mu m$ in thickness.

The electron beam may be irradiated with for 1 to 60 seconds. Preferably, the electron beam may be irradiated with for 20 to 40 seconds. The time period of electron beam irradiation is required to uniformly bind uniform nanoparticles of 2.5 nm to 3.0 nm to the catalyst support, and it was confirmed that uniform nanoparticles of 2.5 nm to 3.0 nm were uniformly bound to a catalyst support when irradiated for 20 to 40 seconds through a plurality of experiments.

In an embodiment, for electron beam irradiation by the apparatus for synthesizing nanoparticles, a tube current may be 1 mA to 23 mA, a tube voltage may be 0.1 MeV to 0.3 MeV, a distance to subject may be 40 mm, and a direction of electron beam irradiation may be a horizontal direction. Preferably, the tube voltage may be 0.2 MeV and the tube current may be 5 mA.

When the influence of the energy magnitude in the apparatus for synthesizing nanoparticles was 0.1 MeV to 0.3 MeV, the tube voltage allowed for more uniform results of synthesis of nanoparticles, and stabilization of synthesis was achieved when the tube current was 5 mA, among tube currents of 1 mA to 23 mA. Because the distance to subject has a more preferred effect as the distance at which electrons are emitted decreases, the distance to subject was fixed at 40 mm in consideration of a current equipment level. The irradiation may be performed in the horizontal direction for safe operation of equipment. Various other process conditions well known to those of skill in the art may be used.

In addition, the chiller 500 configured to transfer a refrigerant material through the cooler pipe 510 may be driven in order to cool the reactor 300 to produce uniform platinum nanoparticles when an electron beam is irradiated with by using the electron beam irradiator 200. Accordingly, uniform platinum nanoparticles may be produced.

In general, platinum nanoparticles are sensitive to minor external reactions (e.g., temperature) and thus are difficult to be produced to be uniform in size. Because non-uniform platinum nanoparticles cause a decrease in fuel cell performance, it is important to produce uniform platinum nanoparticles. Accordingly, by keeping the temperature of the reactor 300 uniform by using the chiller 500, platinum nanoparticles that are uniform in size may be produced, which also enables catalyst production.

When, by using the above-described apparatus for synthesizing nanoparticles, an electron beam is emitted by using the electron beam irradiator in a state in which the platinum precursor solution is accommodated in the reactor, such that the platinum precursor solution is irradiated for a preset time period with the electron beam transmitted through the transmission window, the preparing of the catalyst (S130) in which platinum nanoparticles are supported on the catalyst support is performed as a platinum salt is reduced through the irradiation with the electron beam, and accordingly, nano-sized platinum nanoparticles are produced and supported on the catalyst support, and after a drying process, a catalyst for a fuel cell is completely prepared.

FIGS. 14A to 20 are diagrams showing physical properties (transmission electron microscopy (TEM) and X-ray powder diffraction (XRD)) and electrochemical properties (oxygen reduction reaction (ORR)) of catalysts for a fuel cell, which were prepared under the same conditions except for only a time period of electron beam irradiation by using the apparatus for synthesizing nanoparticles.

Figure 14A:
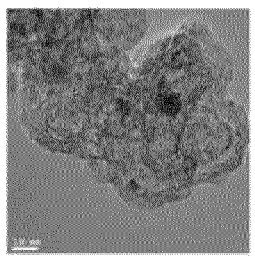
FIGS. 14A to 14F are transmission electron microscopy (TEM) images of catalysts for a fuel cell, which were prepared under the same conditions except for only a time period of electron beam irradiation by using an apparatus for synthesizing nanoparticles.
Figure 14B:
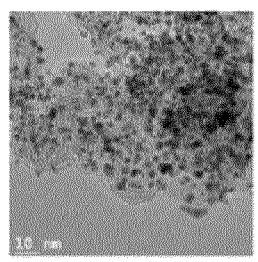
Figure 14C:
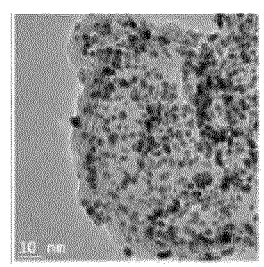
Figure 14D:
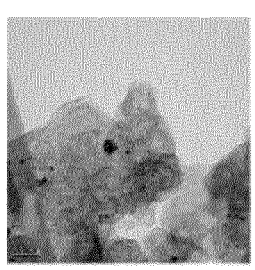
Figure 14E:
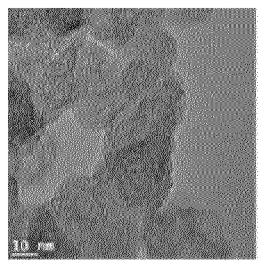
Figure 14F:
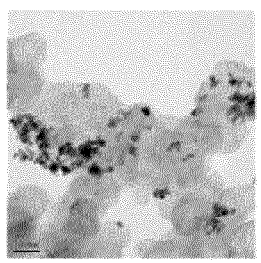

FIGS. 14A to 14F are TEM images, in detail, FIG. 14A illustrates a case in which the time period of electron beam irradiation is 1 second, FIG. 14B illustrates a case in which the time period of electron beam irradiation is 20 seconds, FIG. 14C illustrates a case in which the time period of electron beam irradiation is 40 seconds, FIG. 14D illustrates a case in which the time period of electron beam irradiation is 60 seconds, and FIG. 14E illustrates a case in which the time period of electron beam irradiation is 0 seconds, and FIG. 14F illustrates a case in which the time period of electron beam irradiation exceeds 60 seconds.

The TEM images of FIGS. 14A to 14F are to confirm the distribution, dispersion, and particle size of nanoparticles, and as illustrated in FIGS. 14B and 14C, when the time period of electron beam irradiation is 20 seconds to 40 seconds (Samples 2 and 3), nanoparticles of 2.5 nm to 3.0 nm are uniformly bound to a carbon support, whereas, when, as illustrated in FIG. 14A, the time period of electron beam irradiation is 1 second, which is a relatively short period (Sample 1), or when, as illustrated in FIG. 14D, the time period of electron beam irradiation is 60 seconds, which is a relatively long period (Sample 4), nanoparticles are not formed or an agglomeration of nanoparticles is observed.

In addition, as illustrated in FIG. 14E, a sample that has not undergone electron beam irradiation does not have reduction energy to form nanoparticles, and thus the synthesis of particles is not performed, and as illustrated in FIG. 14F, when the time period of electron beam irradiation exceeds 60 seconds, a side reaction occurs due to the reduction energy more than necessary, resulting in an aggregation of particles and the formation of by-products.

Figure 16:
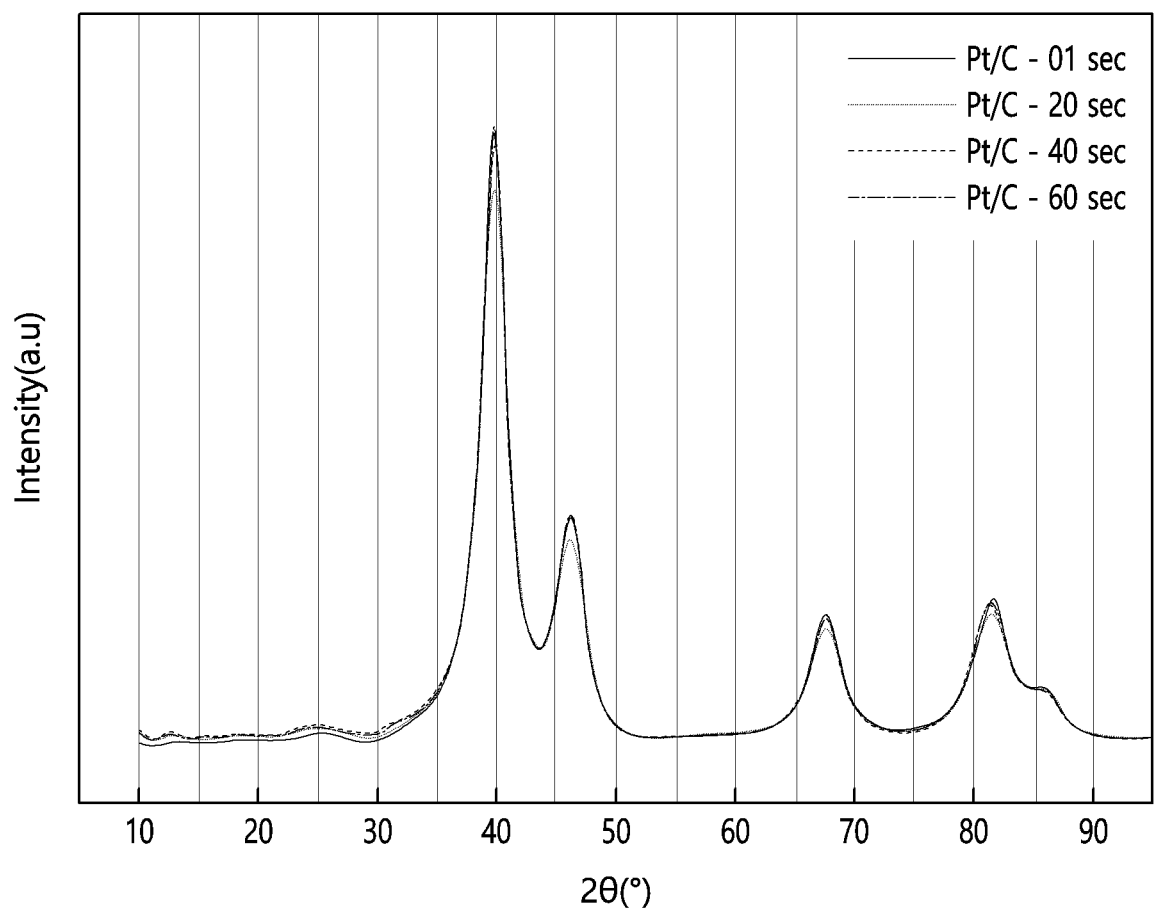
Figure 17:
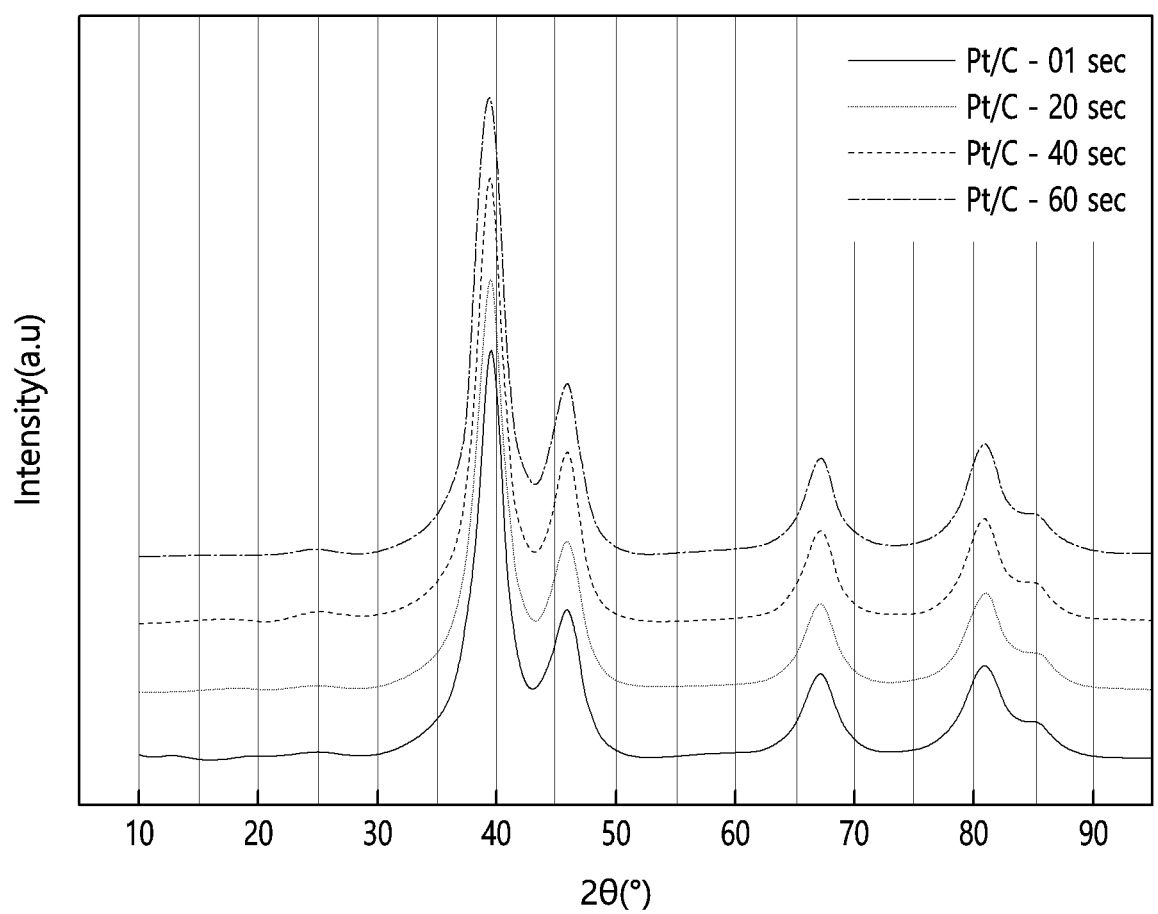

FIGS. 15 to 17 are a table and a graph showing XRD results, and FIG. 17 is a graph obtained by enlarging the vertical axis of the graph of FIG. 16 for detail.

As illustrated in FIGS. 15 to 17, it may be seen that the cases of the time period of electron beam irradiation being 1 second (Sample 1), 20 seconds (Sample 2), 40 seconds (Sample 3), and 60 seconds (Sample 4) all show typical platinum nanoparticles having the same 2-theta value of about 39.8° peak (111) plane. However, in Samples 1 and 4, it may be confirmed that nanoparticles were not formed or grown, and an agglomeration and an increase in particle size occurred due to excessive growth.

Figure 19:
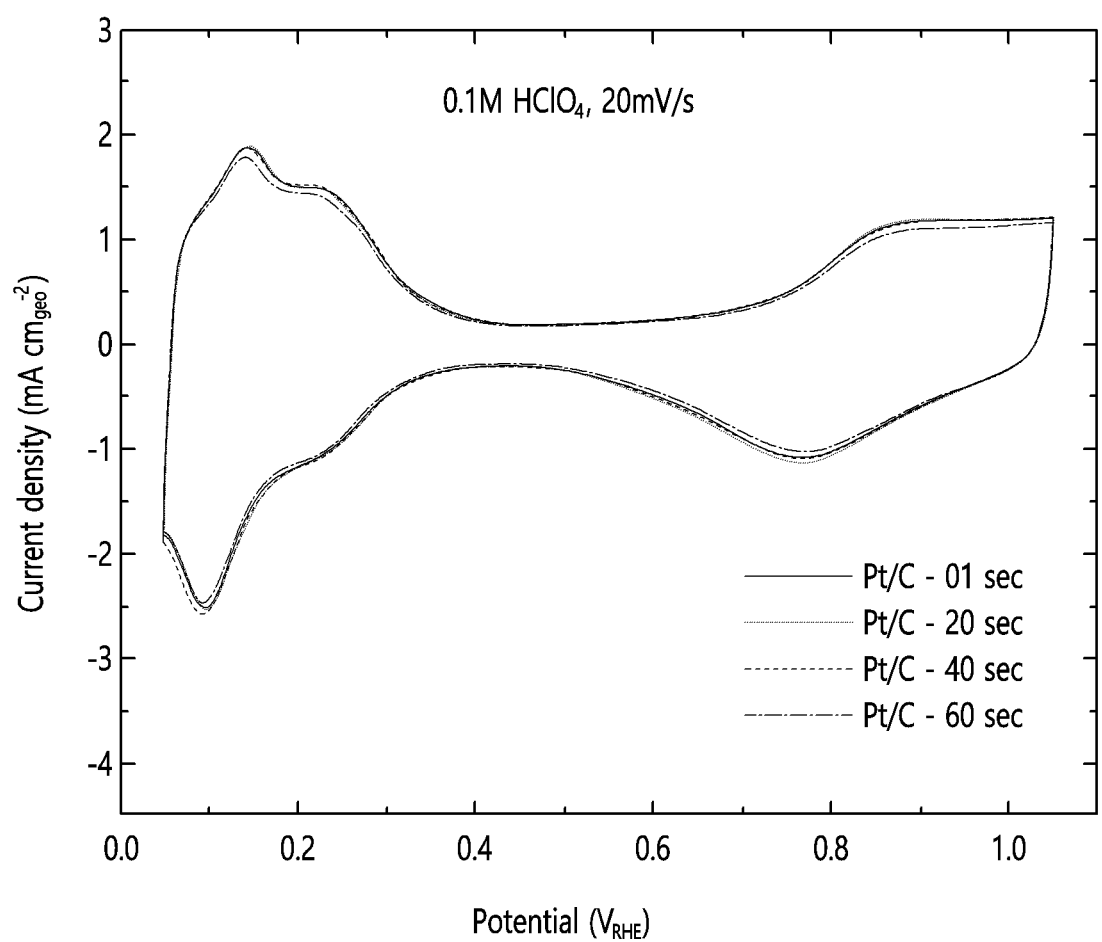
Figure 20:
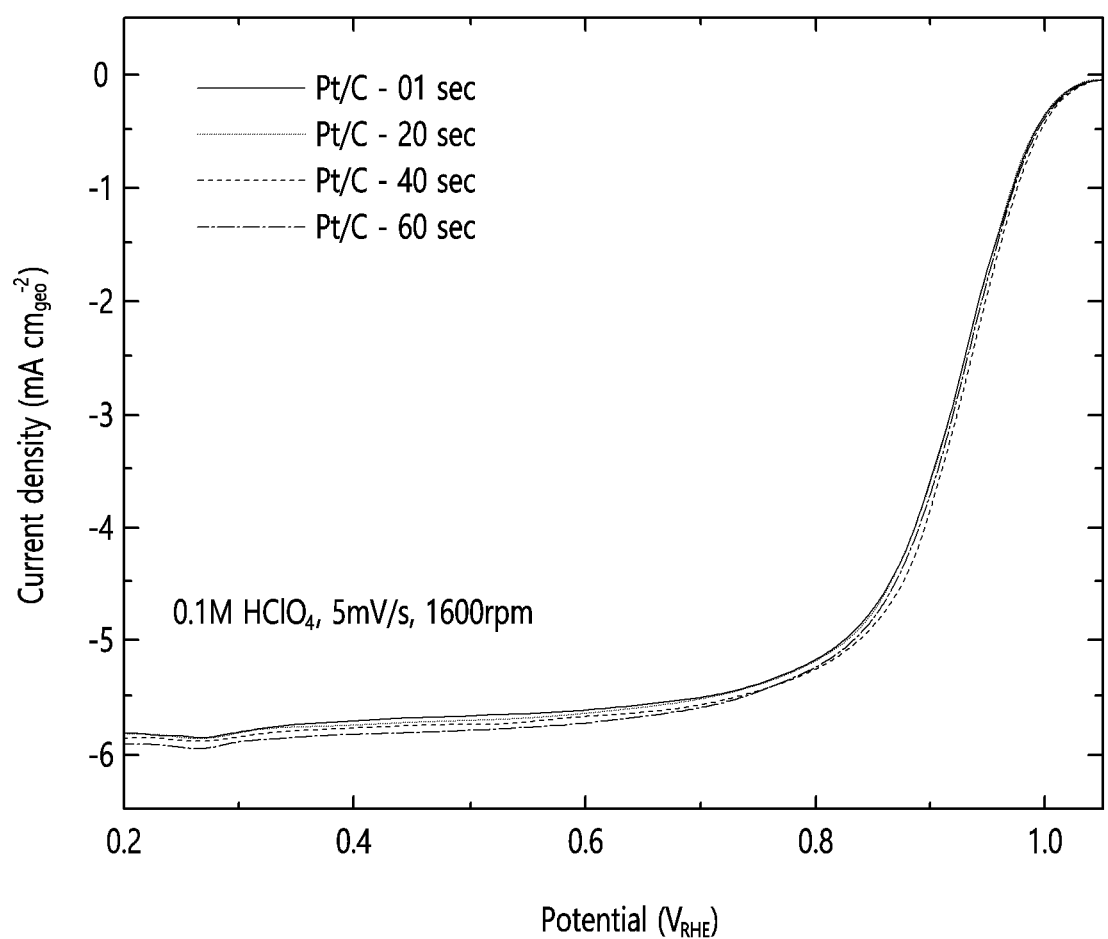

FIGS. 18 to 20 are a table and graphs of electrochemical evaluation (ORR), a result of which shows a change in electrochemically active surface area (ECSA) of metal particles.

As illustrated in FIGS. 18 to 20, as in Samples 2 and 3, it may be seen that a catalyst with uniform particle sizes has a large ECSA. That is, it may be seen that a catalyst synthesized under the optimal conditions has uniformly distributed fine particles, and thus a wide ECSA. As a result, it may be seen that they exhibit high performance due to excellent activity. On the other hand, it may be seen that Sample 4 in which the time period of electron beam irradiation is 60 seconds has a relatively small ECSA, which means that the particles are large in size and small in surface area, resulting in low performance.

As described above, according to the present disclosure, a catalyst is prepared by causing a reduction reaction at room temperature for a short time (several seconds to several minutes) without using a reducing agent and by using the energy of an electron beam that is much more powerful (up to 300 KeV) than conventional thermal energy or chemical energy, thus it is possible to prepare catalysts in a simple and more productive manner, and a simple process of producing uniform metal nanoparticles in a short time by irradiating a metal salt-containing solution with an electron beam yields only a few chemical by-products, may be continuously performed for mass production, and thus is eco-friendly. Furthermore, fine nanoparticles are uniformly distributed on a catalyst support, resulting in a wide ECSA and improved performance.

While the present disclosure has been described with reference to exemplary embodiments illustrated in accompanying drawings for a thorough understanding of the present disclosure, it should be understood as not limiting the present disclosure. Further, it will be clear to those of skill in the art that various changes and modifications may be made without departing from the basic principles of the present disclosure.

| [EXPLANATION OF REFERENCE NUMERALS] | |
|---|---|
| 100: radiation shielding chamber | 110: bottom plate |
| 112: transfer rail | 114: transfer block |
| 120 [측＊1]: side plate | 122: opening and closing door |
| 130: top plate | 140: partition wall |
| 142: transmission window | 200: electron beam irradiator |
| 300: reactor | 500: chiller |
| 510: cooler pipe | 600: control unit |

What is claimed is:

1. An apparatus for synthesizing nanoparticles, the apparatus comprising:
   a radiation shielding chamber having a partition wall dividing an inner space thereof and an opening formed on a bottom surface of the inner space;
   an electron beam irradiator formed in the inner space of one side of the partition wall;
   a reactor formed in the inner space of another side of the partition wall;
   a power source unit formed in a lower part of the radiation shielding chamber and including a high-voltage cable passing through the opening;
   a chiller formed in a lower part of the radiation shielding chamber and including a cooler pipe passing through the opening; and
   a cable bracket including a lower cap, which has a lower opening formed in a part corresponding to one side of the opening and covers a lower part of the opening, an upper cap, which has an upper opening formed in a part corresponding to another side of the opening and covers an upper part of the opening, and a vertical plate formed between the lower cap and the upper cap,
   wherein the high-voltage cable and the cooler pipe are formed to be in a zigzag pattern in the cable bracket.

2. The apparatus of claim 1, wherein a transmission window is formed in the partition wall of the radiation shielding chamber,
   the reactor includes a container body and a container cover covering an upper part of the container body, and the container body has a container window formed therein to correspond to the transmission window.

3. The apparatus of claim 1, wherein a lower insertion groove is formed on the lower cap,
an upper insertion groove is formed on the upper cap, and
a lower shielding bar and an upper shielding bar are inserted into the lower insertion groove and the upper insertion groove, respectively.

4. The apparatus of claim 3, wherein the lower shielding bar and the upper shielding bar are each formed as a lead block having an outer surface surrounded by an iron plate.

5. The apparatus of claim 1, wherein the cable bracket further includes a guide cap formed in an upper part of the upper opening.

6. The apparatus of claim 5, wherein the guide cap is formed to be laterally open along a longitudinal direction of the opening.

7. The apparatus of claim 1, wherein an auxiliary hole is formed in the bottom surface of the inner space of the radiation shielding chamber, and
the apparatus further comprises an auxiliary bracket including a lower auxiliary cap covering a lower part of the auxiliary hole and having a lower hole formed in a bottom surface thereof, and an upper auxiliary cap covering an upper part of the auxiliary hole and having a side opening formed in a side surface thereof.

8. The apparatus of claim 7, wherein the side opening of the upper auxiliary cap is formed on a side surface thereof opposite to a direction corresponding to the partition wall.

9. An apparatus for synthesizing nanoparticles, the apparatus comprising:
a radiation shielding chamber having a partition wall dividing an inner space thereof and an opening formed on a bottom surface of the inner space;
an electron beam irradiator formed in the inner space of one side of the partition wall;
a reactor formed in the inner space of another side of the partition wall;
a cable bracket including a lower cap, which has a lower opening formed therein and covers a lower part of the opening, and an upper cap, which has an upper opening formed therein and covers an upper part of the opening;
a power source unit formed in a lower part of the radiation shielding chamber and including a high-voltage cable passing through the opening through the lower opening and the upper opening; and
a chiller formed in a lower part of the radiation shielding chamber and including a cooler pipe passing through the opening through the lower opening and the upper opening,
wherein the cable bracket further includes a guide cap formed in an upper part of the upper opening.

10. The apparatus of claim 9, wherein the guide cap is formed to be laterally open along a longitudinal direction of the opening.

11. The apparatus of claim 9, wherein the cable bracket has at least two vertical plates formed between the lower cap and the upper cap.

12. The apparatus of claim 9, wherein a transfer rail and a transfer block reciprocally movable along the transfer rail are formed on a bottom surface of the radiation shielding chamber, and
the reactor is movable through the transfer block.

13. The apparatus of claim 9, wherein an auxiliary hole is formed in the bottom surface of the inner space of the radiation shielding chamber, and
the apparatus further comprises an auxiliary bracket including a lower auxiliary cap covering a lower part of the auxiliary hole and having a lower hole formed in a bottom surface thereof, and an upper auxiliary cap covering an upper part of the auxiliary hole and having a side opening formed in a side surface thereof.

14. The apparatus of claim 13, wherein the side opening of the upper auxiliary cap is formed on a side surface thereof opposite to a direction corresponding to the partition wall.

15. An apparatus for synthesizing nanoparticles, the apparatus comprising:
a radiation shielding chamber having a partition wall dividing an inner space thereof, and an opening and an auxiliary hole formed on a bottom surface of the inner space;
an electron beam irradiator formed in the inner space of one side of the partition wall;
a reactor formed in the inner space of another side of the partition wall;
a cable bracket including a lower cap, which has a lower opening formed therein and covers a lower part of the opening, and an upper cap, which has an upper opening formed therein and covers an upper part of the opening; and
an auxiliary bracket including a lower auxiliary cap, which has a lower opening formed on a bottom surface thereof and covers a lower part of the auxiliary hole, and an upper auxiliary cap, which has a side opening formed on a side surface thereof opposite to a direction corresponding to the partition wall and covers an upper part of the auxiliary hole,
wherein the cable bracket and the auxiliary bracket are formed of lead or a metal material containing lead.

16. The apparatus of claim 15, wherein the cable bracket has at least two vertical plates formed of lead or a metal material containing lead between the lower cap and the upper cap.

17. The apparatus of claim 15, wherein a lower insertion groove is formed on the lower cap,
an upper insertion groove is formed on the upper cap, and
a lower shielding bar and an upper shielding bar are inserted into the lower insertion groove and the upper insertion groove, respectively.

18. The apparatus of claim 15, wherein the lower shielding bar and the upper shielding bar are each formed as a lead block having an outer surface surrounded by an iron plate.

19. The apparatus of claim 15, wherein the cable bracket includes a guide cap formed on an upper part of the upper cap, and
the guide cap is formed of lead or a metal material containing lead.

20. The apparatus of claim 15, wherein one or more exhaust holes are formed on a top surface of the radiation shielding chamber, and
the apparatus further comprises an exhaust unit including a lower exhaust bracket covering a lower side of the exhaust hole, an upper exhaust bracket covering an upper side of the exhaust hole, and a middle plate vertically dividing an inner space of the upper exhaust bracket.

* * * * *